United States Patent [19]

Calandra, Jr. et al.

[11] Patent Number: 5,064,312
[45] Date of Patent: Nov. 12, 1991

[54] DELAY STOPPER FOR A MINE ROOF ANCHOR AND METHOD OF MANUFACTURE THEREOF

[75] Inventors: Frank Calandra, Jr., Pittsburgh, Pa.; Jerry Frease, Lexington, Ky.

[73] Assignee: Jennmar Corporation, Pittsburgh, Pa.

[21] Appl. No.: 559,154

[22] Filed: Jul. 24, 1990

Related U.S. Application Data

[60] Division of Ser. No. 384,123, Jul. 20, 1989, abandoned, which is a continuation of Ser. No. 243,928, Sep. 13, 1988, abandoned.

[51] Int. Cl.$^5$ ............... F16B 31/02; E21D 20/02; B21D 53/24
[52] U.S. Cl. ............... 405/259.5; 405/259.4; 264/267; 411/3; 411/10
[58] Field of Search ............. 405/259, 260, 261; 264/267, 310; 411/3, 10, 377, 429

[56] References Cited

U.S. PATENT DOCUMENTS

| | | | |
|---|---|---|---|
| 3,316,338 | 4/1967 | Rieka | 264/267 |
| 4,347,020 | 8/1982 | White et al. | 405/260 |
| 4,357,726 | 11/1982 | Trimmer | 264/267 X |
| 4,556,350 | 12/1985 | Bernhardt et al. | 405/260 X |
| 4,708,550 | 11/1987 | Hamilton | 411/3 |

Primary Examiner—Dennis L. Taylor
Assistant Examiner—Arlen L. Olsen
Attorney, Agent, or Firm—Stanley J. Price, Jr.

[57] ABSTRACT

A delay stopper for use in a mine roof anchor is provided. A mine roof anchor has a threaded roof bolt and a threaded receiving member for the roof bolt whereby the roof bolt and the receiving member initially rotate as a unit to mix resin components that are placed in the bore hole in a destructible capsule above the roof anchor. When the roof anchor is placed in the bore hole, the destructible capsule is ruptured, and the components within the capsule are mixed to form resin which at least partially secures the mine roof anchor within the bore hole. The delay stopper causes the roof bolt and the threaded receiving member to rotate as a unit to mix the resin after the capsule ruptures. The delay stopper has a cylindrical body portion interfitting into the threads of the threaded receiving member and a conical end portion formed on the cylindrical body portion and extending axially from the body portion in a direction toward the end of the roof bolt. The delay stopper is preferably formed of an epoxy resin. A method of forming the delay stopper within the threads of the threaded receiving member is also provided.

3 Claims, 2 Drawing Sheets

DELAY STOPPER FOR A MINE ROOF ANCHOR AND METHOD OF MANUFACTURE THEREOF

CROSS REFERENCE TO RELATED APPLICATIONS

This application is a division of copending application Ser. No. 384,123, filed on July 20, 1989, entitled "Delay Stopper For A Mine Roof Anchor And Method Of Manufacture Thereof", now abandoned, which is a continuation of application Ser. No. 243,928 filed on Sept. 13, 1988 entitled "Delay Stopper For A Mine Roof Anchor And Method Of Manufacture Thereof", now abandoned.

BACKGROUND OF THE INVENTION

1. Field Of The Invention

This invention relates to a delay stopper for use in mine roof anchors wherein a roof bolt is threaded into a threaded member and the roof bolt and the threaded member rotate as a unit in order to mix resin that at least partially secures the mine roof anchor within a bore hole formed in the mine roof. The invention also relates to a method of manufacturing the delay stopper.

2. Description Of The Prior Art

It is well-known in the art of mine roof support to tension bolts anchored in bore holes drilled in the mine roof to reinforce the unsupported rock formation above the roof. Conventionally, a bore hole is drilled through the roof into the rock formation. The end of the bolt in the rock formation is anchored by either engagement of an expansion shell on the end of the bolt with the rock formation, or adhesively bonding the bolt by a resin to the rock formation, or by utilizing a combination of an expansion shell and resin bonding to secure the roof anchor within the bore hole.

U.S. Pat. Nos. 3,877,235, 4,051,683, and 4,477,209 all disclose the adhesive bonding of an element of a mine roof anchor within a bore hole. Each of these patents shows some form of delay mechanism to permit the roof bolt and the portion to be bonded to rotate as a unit while the resin is being mixed.

U.S. Pat. Nos. 4,413,930, 4,419,805, 4,516,885, 4,518,292, and 4,611,954 all disclose mine roof anchors in which an expansion shell and resin bonding are utilized in combination to anchor the mine roof anchor within the bore hole formed in the mine roof. These patents also disclose a delay mechanism utilized to prevent relative rotation of the mine roof bolt and the expansion shell while the resin components are being mixed.

U.S. Pat. Nos. 3,940,941, 3,979,918, 4,295,761, British Patent No. 2,067,702, Australian Patent Abstract AV-A1-68 116/81 and Australian Patent Abstract AU-A-78 424/81 all disclose forms of threaded members securable to the ends of mine roof anchors adjacent the mine roof to tension the roof anchor after it has been secured within the bore hole formed in the roof. The threaded members have delay mechanisms which break away when a predetermined torque is exceeded.

While each of the foregoing patents discloses a delay means to permit the mixing of the resin during rotation of the shaft of a mine roof bolt and the anchoring mechanism as a unit and thereafter to provide for tensioning of the mine roof bolt after the anchoring unit has been fixed to the bore hole, there is still a need for an improved delay stopper for such roof anchors that provides consistent delay, is readily manufactured, and is economical to manufacture.

SUMMARY OF THE INVENTION

In accordance with the present invention there is provided a delay stopper positioned within a threaded receiving member to prevent rotation between the receiving member and the threaded end of a mine roof bolt having a bolt head formed on the other end that is received within it. Rotation is prevented until the torque between the mine roof bolt and the receiving member exceeds a predetermined amount. The delay stopper comprises an epoxy resin molded into the threaded receiving member. The epoxy resin completely blocks the threaded passage of the threaded receiving member. The epoxy resin breaks away from the threaded receiving member when the torque exceeds a predetermined amount.

Further, in accordance with the present invention, there is provided a delay stopper for use in a mine roof anchor having a threaded roof bolt and a threaded receiving member for the roof bolt. The roof bolt and the receiving member initially rotate as a unit to mix resin that at least partially secures the mine roof anchor within a bore hole. The delay stopper comprises a cylindrical body portion that interfits into the threads of the threaded receiving member. A conical end portion is formed on the cylindrical body portion and extends axially from the body portion in a direction toward the end of the roof bolt. The delay stopper is formed from material that is structurally weaker than the roof bolt and the receiving member.

Still further, in accordance with the present invention, there is provided a method of manufacturing a threaded receiving member for a mine roof anchor having a delay stopper to prevent rotation of the receiving member relative to a threaded mine roof bolt. The method includes positioning the threaded receiving member with the threaded passage in a vertical position. A mold element is then positioned within the receiving member below the point where the delay stopper is to be positioned within the receiving member. Liquid epoxy resin is poured into the receiving member above the mold element. The epoxy resin is allowed to harden, and the mold element is then removed from the threaded receiving member.

Accordingly, the principal object of the present invention is to provide a delay stopper for retarding the rotation of a mine roof bolt relative to the threaded member which receives it until a predetermined torque between the two elements is exceeded.

Another object of the present invention is to provide a method for installing a delay stopper into a threaded receiving member.

Another object of the present invention is to provide a delay stopper formed from epoxy resin which will fail when the torque between a mine roof anchor bolt and the threaded receiving member for the mine roof anchor bolt exceeds a predetermined amount.

These and other objects of the present invention will be more completely disclosed and described in the following specification, the accompanying drawings, and the appended claims.

DESCRIPTION OF THE PREFERRED EMBODIMENTS

Figure 1:
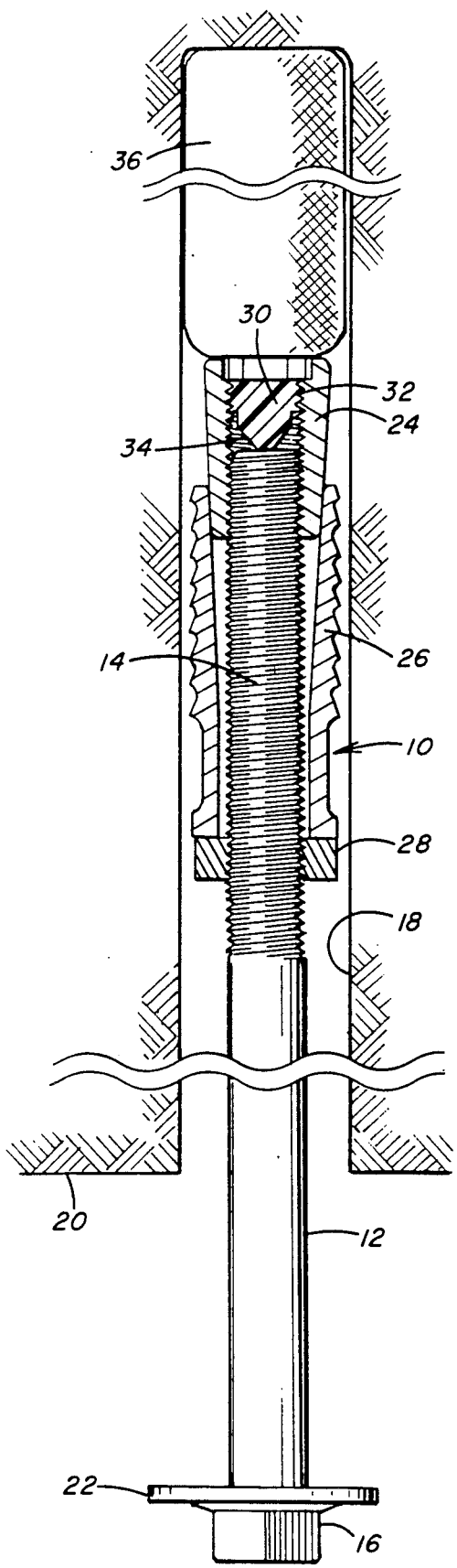
FIG. 1 is a sectional view of a mine roof anchor having a mechanical expansion shell utilizing the delay stopper of the present invention.
Figure 3:
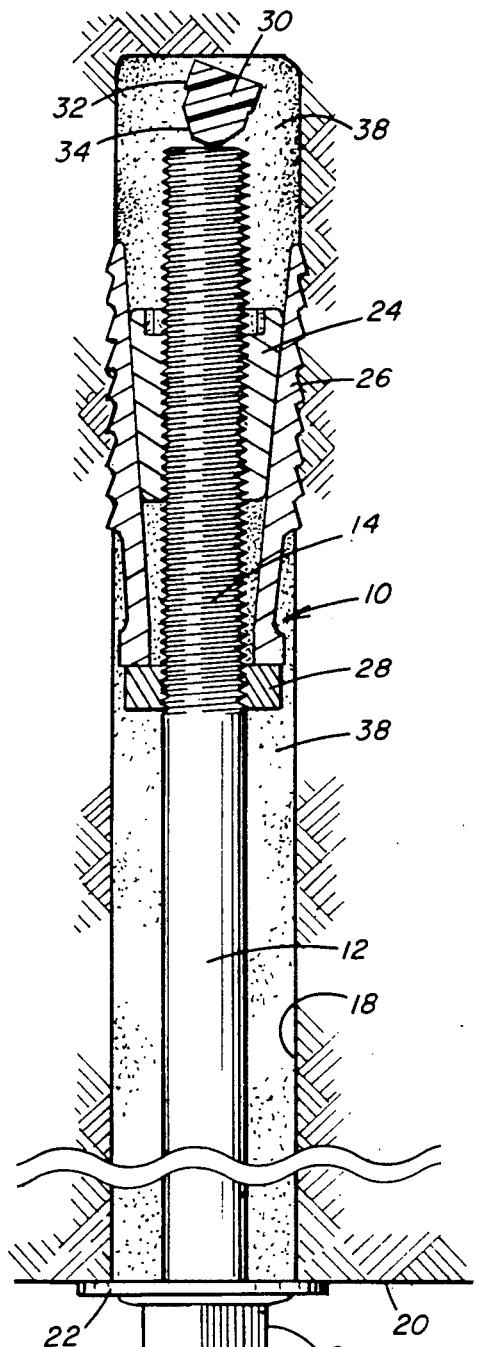
FIG. 3 is a sectional view of the mine roof anchor of FIG. 1 showing the anchor in a fully installed condition.
Figure 2:
FIG. 2 is a perspective view of the delay stopper of the present invention.

Referring to the drawings and particularly to FIGS. 1, 2, and 3, there is illustrated a roof anchor indicated generally at 10 which has a roof bolt 12 as a component thereof. The roof bolt 12 has a threaded end portion 14 at one end and a bolt head 16 formed at the other end thereof. The mine roof bolt 12 extends upwardly into a bore hole 18 formed in the mine roof 20. A bearing plate 22 surrounds the roof bolt 12 adjacent the bolt head 16.

The threaded end portion 14 of bolt 12 is threadingly received within a tapered plug 24. Surrounding the tapered plug 24, in conventional fashion, is an expansion shell 26 that has individual leaves that are forced outwardly when the tapered plug 24 is threaded downwardly onto the roof bolt 12. The expansion shell 26 is supported by a support nut 28 threaded onto roof bolt 12. The support nut 28 supports the expansion shell 26 in position prior to expansion of the shell 26.

A delay stopper 30 is positioned within the threaded portion of the tapered plug 24, as seen in FIG. 1. The delay stopper is formed with a cylindrical body 32 and a conical end 34 extending axially from the body 32. The delay stopper 30 of the present invention is preferably formed from an epoxy resin.

A resin capsule 36, as shown in FIG. 1, is inserted into the bore hole 18 above the roof anchor 10. The resin capsule 36 is of conventional construction and contains a resin component and a catalyst component in separate compartments. Upon fracture of the resin capsule 36 and rotation of the roof anchor 10, the components within the resin capsule 36 are mixed together to provide a resin which will set and harden within the bore hole 18.

In operation, the resin capsule 36 is positioned within the bore hole 18. The roof anchor 10 is then placed within the bore hole and moved upwardly. Upward movement of the roof anchor 10 fractures the resin capsule 36. The roof bolt 12 is then rotated and, because of the delay stopper 30, the roof bolt 12, the tapered plug 24 and the expansion shell 26 rotate as a unit causing the resin and catalyst components released from the capsule 36 to mix together. The mixed resin then flows downwardly over the roof anchor 10 until it begins to gel. When the resin begins to gel, the torque required to turn the roof anchor 10 increases because of the adhesion of the outer portion of the expansion shell 26 to the bore hole 18.

When the resin has gelled sufficiently to cause an increased torque above a predetermined amount, the delay stopper 30, which is formed of structurally weaker material than the roof bolt 12 and the tapered plug 24, will become displaced from the tapered plug 24 and the roof bolt 12 will begin to turn relative to tapered plug 24.

As seen in FIG. 3, the roof bolt has been threaded upwardly through the tapered plug 24 after the delay stopper 30 has been displaced. By continuing to rotate the roof bolt 12, the bearing plate 22 is drawn up against the mine roof 20 and tension is created on the roof bolt 12 between the expansion shell 26 and the bolt head 16. The free resin 38 has flowed completely around the expansion shell and down along the shaft of the roof bolt 12.

As shown in FIGS. 1 and 3, the roof bolt 12 is a smooth bolt with a threaded end 14. It should be appreciated that roof bolt 12 could also be formed from a concrete reinforcing bar with a head formed on one head and a threaded portion formed on the other end.

Figure 4:
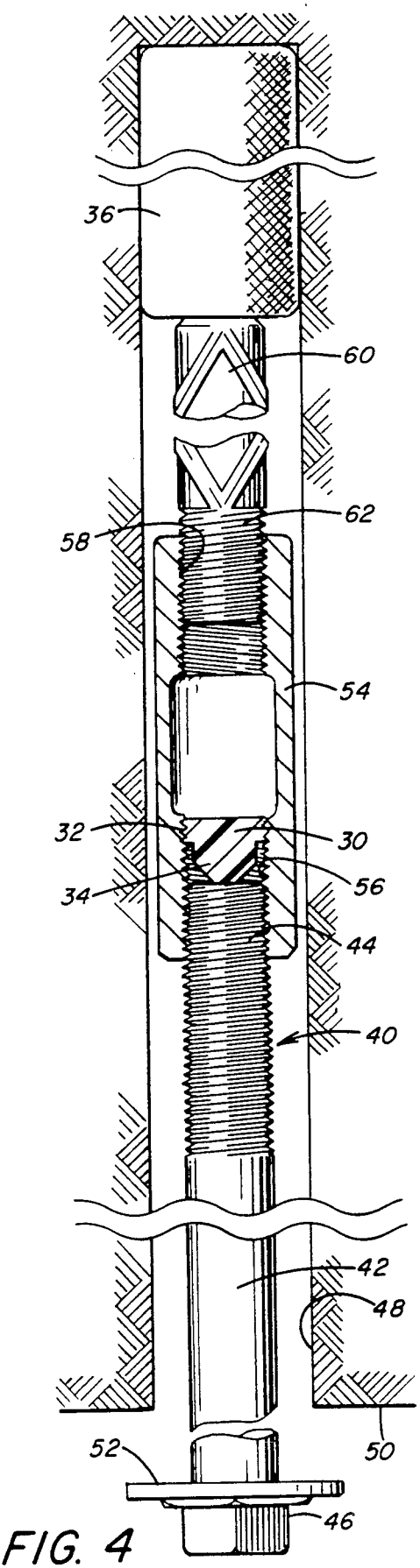
FIG. 4 is a sectional view of mine roof anchor utilizing a concrete reinforcing bar securable by resin within the bore hole of a mine roof and utilizing a coupler with the delay stopper of the present invention to provide tension on the mine roof bolt.
Figure 5:
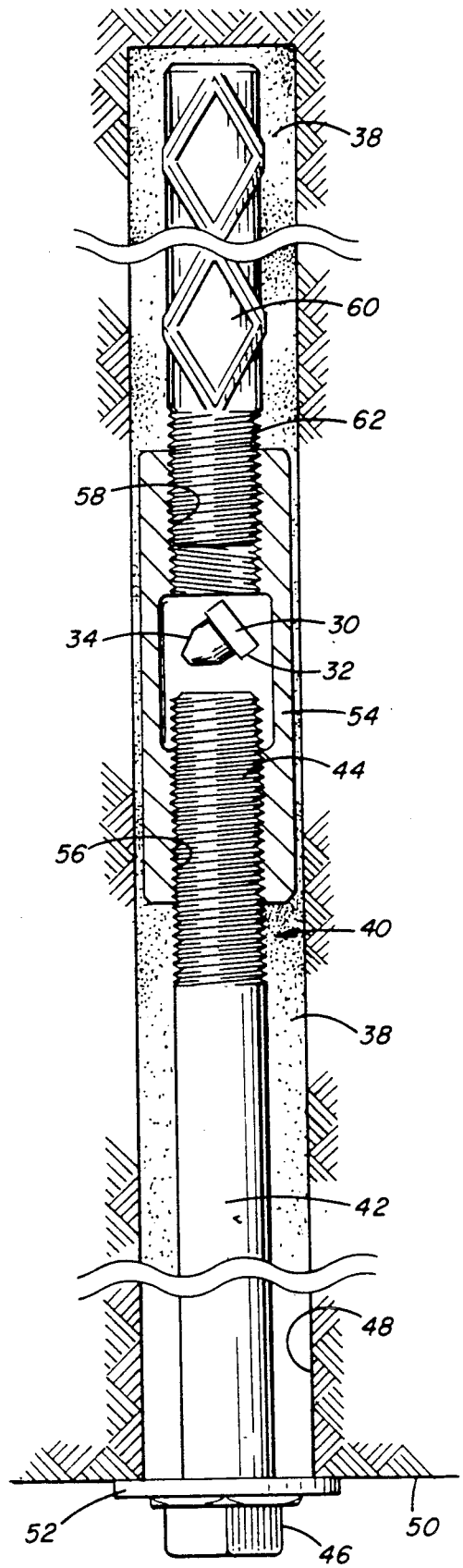
FIG. 5 is a sectional view of the roof anchor of FIG. 4 in a fully installed condition.

Referring now to FIGS. 4 and 5, there is shown a roof anchor indicated generally at 40. The roof anchor has a roof bolt 42 with a threaded end portion 44 and a bolt head 46. The roof bolt 42 is received within a bore hole 48 formed in the mine roof 50. A bearing plate 52 surrounds the roof bolt 42 adjacent the head 46.

The threaded end portion 44 of roof bolt 42 is threadingly received within a coupler 54. Coupler 54 has a cylindrical body with internal threads 56 formed on one end to receive the roof bolt 12 and internal threads 58 formed on the other end to receive a concrete reinforcing bar 60. The concrete reinforcing bar has a threaded end 62 and the threads on the reinforcing bar are such that the concrete reinforcing bar 60 seats against the coupler 54 and is prevented from further rotation relative to coupler 54. The internal threads 58 that receive the reinforcing bar 60 are of a larger diameter than the internal threads 56 which receive the roof bolt 42.

Positioned within the internal threads 56 of coupler 54 is the delay stopper 30 shown in detail in FIG. 2. The delay stopper 30 is identical to delay stopper 30 described in connection with FIGS. 1, 2 and 3. The delay stopper 30 serves to prevent relative rotation of the roof bolt 42 and the coupler 54 until a predetermined torque is exceeded between those elements.

As seen in FIGS. 4 and 5, the roof anchor 40 is positioned within a bore hole 48 below a resin capsule 36. The resin capsule 36 has previously been described in connection with the embodiment of FIGS. 1-3. When the roof anchor 40 is thrust upwardly into capsule 36 and rotated, the capsule fractures and the components within capsule 36 become moist to form a resin which flows downwardly and surrounds the concrete reinforcing bar 60. After the resin begins to gel, the concrete reinforcing bar 60 is fixed within the bore hole 48. When the concrete reinforcing bar 60 adheres to bore hole 48, concrete reinforcing bar 60 and coupler 54 resist rotation. The mine roof bolt 42 continues to be rotated and the increased torque between roof bolt 42 and coupler 54 causes the delay stopper 30 to fail and to be moved upwardly and free of internal threads 56. The delay stopper 30 will assume a position within the interior of the coupler 54, as shown in FIG. 5.

As the roof bolt 42 continues to be rotated, it will move up into coupler 54, as shown in FIG. 5, and tension will be created on the roof bolt 42 between coupler 54 and the bolt head 46.

It will be seen that the roof anchors 10 and 40 of the present invention function in a manner similar to roof anchors that are already known from the prior art. The delay stopper 30 of the present invention is an improved apparatus for providing the stop means necessary to permit the roof anchors to function. Stopper 30 is preferably positioned within the tapered plug 24 or within the coupler 54 by pouring liquid epoxy resin into the threaded portion of tapered plug 24 or coupler 54. Installation of the delay stopper 30 is accomplished by positioning either the tapered plug 24 or the coupler 54 in a vertical position. A mold element (not shown) is then positioned within the threaded portion below the position where the delay stopper 30 is to be located. An epoxy resin is then poured into the appropriate threaded portion of tapered plug 24 or coupler 54. When the epoxy resin hardens, the mold element is removed, and the plug is in place.

Because of the unique conical end 34 formed on the delay stopper 30, there is essentially point contact between the delay stopper 30 and the end of the mine roof bolt 12 or 42. This point contact causes the delay stopper 30 to be forced axially out of the threads and prevents a frictional connection between the end of the mine roof bolt and the delay stopper 30 which might cause the delay stopper to be threaded through the threaded portion of the tapered plug 24 or the coupler 54.

It will also be seen that the length of the cylindrical body 32 of stopper 30 will, in combination with the type of resin utilized to form stopper 30, determine the amount of torque required to break stopper 30 loose from the tapered plug 24 or the coupler 54. By adjusting the length of the cylindrical body 32, the optimum torque to break loose stopper 30 can be obtained for the particular application of the invention being utilized.

According to the provisions of the Patent Statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. The method of manufacturing a threaded receiving member for a mine roof anchor having a delay stopper therein to prevent rotation of said receiving member relative to a threaded mine roof bolt threaded into said threaded receiving member comprising:

positioning said threaded receiving member with internal threads forming said threaded passage in a vertical position;

positioning a mold element having an opening with an annular upper surface, a cylindrical intermediate surface and a conical lower surface closing said mold element within a portion of said receiving member threaded passage below the point where said delay stopper is to be located;

pouring liquid epoxy resin into said receiving member above said mold element;

directing the liquid epoxy resin into the opening of the mold element to the closed end thereof to fill said mold element in said threaded passage of said receiving member with epoxy resin;

allowing said epoxy resin to harden and forming an epoxy resin delay stopper having an upper cylindrical surface, an intermediate cylindrical surface and a conical lower surface;

said delay stopper having a threaded portion mating with a portion of said threads of said receiving member threaded passage thereby threadedly securing said delay stopper in said receiving member;

removing said mold element from said threaded receiving member with said conical portion of said delay stopper spaced from said threaded portion of said receiving member; and obstructing said threaded passage at a preselected location within said receiving member by said delay stopper.

2. The method as set forth in claim 1 including, positioning said mold element so that a portion of said threaded passage in said receiving member above said mold receives a portion of said liquid epoxy resin and forms a mating surface between a portion of said internal threads in said receiving member and forming said delay stopper.

3. The method as set forth in claim 1 which includes, an annular cylindrical portion of said receiver member having a smooth inner surface above said mold which receives a portion of said liquid epoxy and forms a circular disc-like top portion on said delay stopper.

* * * * *